UNITED STATES PATENT OFFICE.

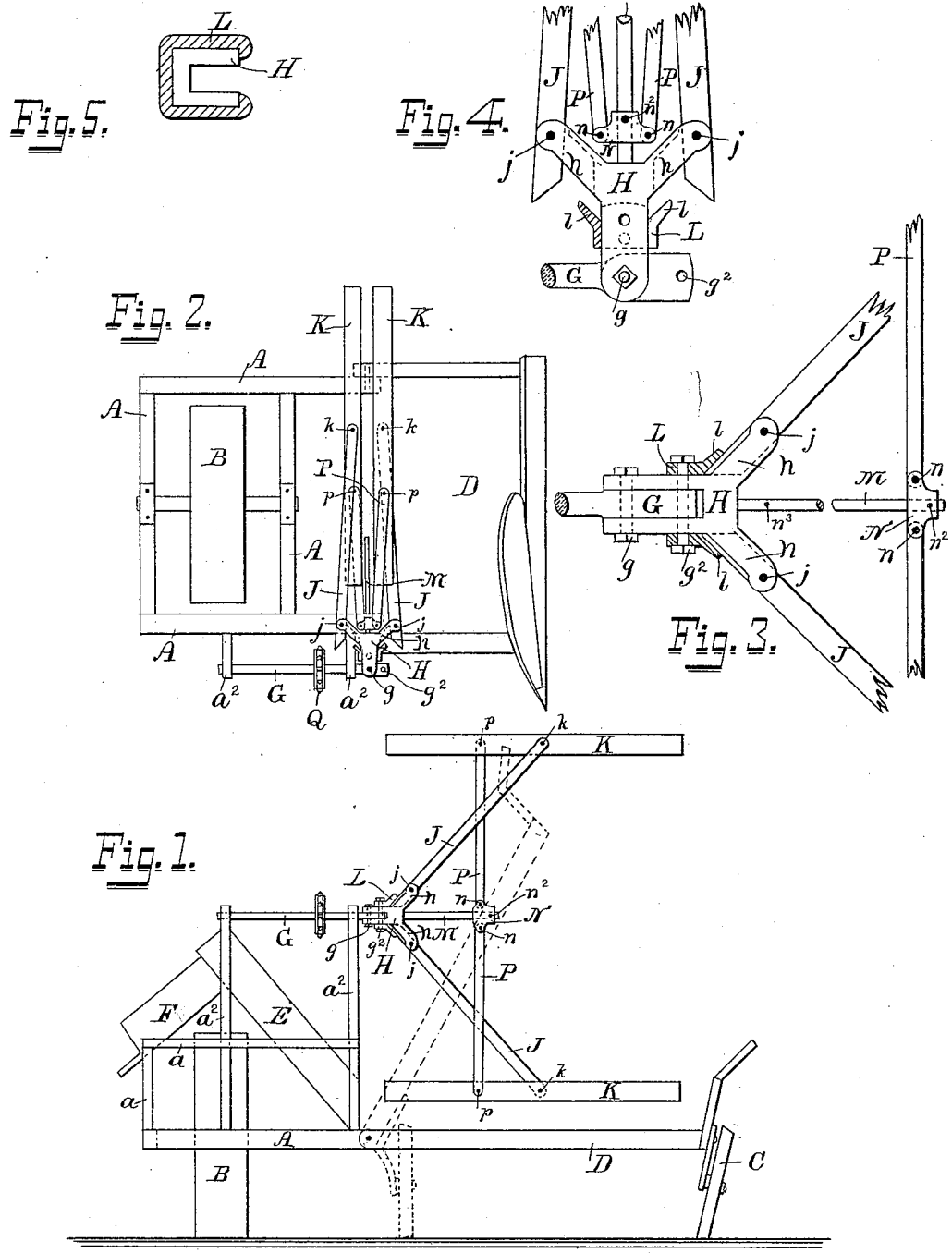

WILLIAM N. WHITELEY AND OSCAR E. PERRIGO, OF SPRINGFIELD, OHIO; SAID PERRIGO ASSIGNOR TO SAID WHITELEY.

HARVESTER-REEL.

SPECIFICATION forming part of Letters Patent No. 495,862, dated April 18, 1893.

Application filed December 17, 1885. Serial No. 185,919. (No model.)

*To all whom it may concern:*

Be it known that we, WILLIAM N. WHITELEY and OSCAR E. PERRIGO, citizens of the United States, residing at Springfield, in the county of Clark and State of Ohio, have invented certain new and useful Improvements in Harvester-Reels, of which the following is a full, clear, and exact description, reference being had to the accompanying drawings, forming a part of this specification.

Our invention relates to harvester reels and to that class of reels which are capable of being folded up in parallel form for transportation, and more especially adapted to harvesters having a folding platform, it being desirable to fold the reel to the side of the machine in such cases.

The objects of our invention therefore, are, to so construct a reel that it may be folded up into a small space and having a joint whereby it may be turned around out of the way so as to allow the platform to be folded up outside or inside of the reel as may be most convenient.

Our invention consists of a head, properly jointed to the reel shaft, the said head having radial projections slotted to receive the reel arms and in which the said arms are pivoted at the inner ends while the outer ends are pivoted to the blades, the arms being held in an extended position by a spider sliding upon the reel head, the blades being further braced and held in position by braces pivoted to them at their outer ends while at their inner ends they are pivoted to a hub sliding on a central, supporting rod or shaft projecting outwardly from the reel head. The folding is accomplished by sliding the hub in which the braces are pivoted, along the supporting shaft and up to the reel head, thus relieving the braces while the arms themselves are released by sliding back the spider; the releasing of which also relieves the joint with the reel shaft proper and allows the reel not only to close up but to swing around horizontally, or by turning the reel shaft one-fourth of a revolution the reel may be folded to a vertical position.

Our device is practically an open reel as the central supporting shaft extends but a short distance from the head, which, in practice may be set far enough back if desired so that the shaft shall not project over the standing grain at all.

In our reel we provide a joint with the reel shaft proper whereby when folded the reel may be swung around out of the way, either horizontally, vertically or at any desired angle.

That others may understand the mechanism of our reel we will more particularly describe it and its connection and application to a harvester.

In the drawings, Figure 1. is a front elevation of our reel shown in an extended position and applied to a harvester. Fig. 2. is a plan of the same machine showing the reel folded and swung around so as to allow the platform to fold up. Fig. 3. is a front elevation, on an enlarged scale, of the reel head, &c., showing the arms and braces extended as seen in Fig. 1. Fig. 4. is a plan, on an enlarged scale, of the head, showing the arms and braces folded and the reel swung back as shown in Fig. 2. Fig. 5, is a cross section of the head and sliding spider.

Similar letters refer to like parts in the several views.

A, A, is the frame of a harvester of the usual construction, supported upon the main driving wheel B, and grain wheel C, at the outer end of the platform D. Upon the frame A, is the usual elevator E, and binding deck F, supported by the framework $a, a, a^2, a^2$, in the usual manner. The uprights $a^2, a^2$, also, support the reel shaft G, which is flattened at the end and has pivoted to it by the bolt $g$, a head H, which is provided with radial projections $h, h$, which have slots formed therein in which the reel arms J, J, are pivoted at $j$. The outer ends of the reel arms J, J, are pivoted to the blades K, K, at $k., k$. The reel arms K, K, are held in an extended position by the sliding spider L, which has angular projections $l, l$, (corresponding to the number of reel arms) which press against the toes of the arms and are confined in that position by the bolt $g^2$, which also renders the joint of the reel head H, with the reel shaft G, rigid when the reel is to be unfolded for work. Fixed in the front of the reel head H, and projecting outwardly is the supporting shaft or rod M, upon which is the sliding head N, which has perforated projections (corresponding to the number of arms) to which are pivoted at $n$, $n$, the braces P, P, whose outer ends are pivoted to the reel blades K, K, at $p$, $p$. When the reel is extended the sliding head N, is held in position by the pin $n^2$.

The reel is driven in the usual manner by a chain from any convenient part of the machine to the sprocket wheel Q, fixed to the shaft G, or by any similar means. It will be readily seen that by placing the various pivotal points of the folding device at a considerable distance from each other as are the pivots $j$, $k$, $n$, $p$, the reel is made much more rigid than it would be if these points were located nearer together. Again, by providing the supporting shaft M, and sliding head N, from which a brace P, extends to each blade of the reel, provision is made for the usual strains as in case one blade meets an obstacle it receives the combined support of all the other arms, blades and braces, as well as of the supporting shaft M, which would not be the case were each arm and blade separate from the others and having their points of attachment only at the reel head. The reel being in the position shown at Figs. 1, and 3, and it is desired to fold it, the pin $n^2$, is removed, allowing the head N, to slide along the supporting shaft M, to the reel-head H. The bolt $g^2$, is removed and the sliding spider L, drawn back, releasing the toes of the arms J, and allowing the reel to fold into the compact form shown in Fig. 2, at the same time the removal of the bolt $g^2$, has released the joint of the reel head H, upon the shaft G, and, turning upon the bolt $g$, as a pivot the whole reel is folded back to the position shown at Fig. 2. The sliding spider L, is made open at one side, as shown in Fig. 5, to allow the flattened end of the shaft G, to swing through it when the reel is folded to the side of the machine. The platform of the machine may then be folded up to the position shown by the dotted lines in Fig. 1, the grain-wheel C., being changed to a point near the inner shoe and acts as a supporting wheel for that side of the machine, or in any convenient manner. Or the platform may be first folded to a vertical position and the reel folded back outside of it and secured in its place by any convenient means.

We generally use five arms to our reel but any number of arms and blades may be used. In the drawings the arms are shown directly opposite each other for convenience of illustration.

Having thus described our invention, which we wish to secure by Letters Patent, we claim—

A harvester reel constructed with a head pivoted or jointed, to a substantially horizontal driving shaft and having formed thereon radial projections to which are pivoted the reel arms, whose outer ends are also pivoted to the reel blades, the reel head having an outwardly projecting supporting shaft upon which is fitted a sliding block having pivoted thereto braces, whose outer ends are also pivoted to the reel blades, all constructed, arranged and operating substantially in the manner and for the purposes shown and described.

WILLIAM N. WHITELEY.
OSCAR E. PERRIGO.

Witnesses:
P. W. KELLY,
F. B. FURNISS.